United States Patent
Hermann et al.

(10) Patent No.: US 7,416,214 B2
(45) Date of Patent: Aug. 26, 2008

(54) MOTOR VEHICLE WITH A MOVABLE ROOF AND AN EXTENSIBLE ROLLOVER PROTECTION ELEMENT

(75) Inventors: Felix Hermann, Leonberg (DE); Dominik Beierl, Korntal-Muenchingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 93 days.

(21) Appl. No.: 11/312,354

(22) Filed: Dec. 21, 2005

(65) Prior Publication Data

US 2006/0131862 A1 Jun. 22, 2006

(30) Foreign Application Priority Data

Dec. 22, 2004 (DE) .................. 10 2004 062 999

(51) Int. Cl.
 *B60S 21/13* (2006.01)
(52) U.S. Cl. ..................................... 280/756
(58) Field of Classification Search ................ 280/756, 280/755; 296/107.03, 219
 See application file for complete search history.

(56) References Cited

U.S. PATENT DOCUMENTS

| 2,184,537 | A | * | 12/1939 | Valletta | ...................... 296/219 |
| 6,572,145 | B1 | | 6/2003 | Guillez et al. | |
| 2005/0082808 | A1 | * | 4/2005 | Wildig et al. | ............... 280/756 |
| 2006/0097499 | A1 | * | 5/2006 | Welch | ........................ 280/756 |

FOREIGN PATENT DOCUMENTS

| DE | G 92 00 457.1 U1 | 5/1993 |
| DE | 103 29 903 B3 | 4/2004 |
| EP | 1 510 412 A1 | 3/2005 |

* cited by examiner

*Primary Examiner*—Eric Culbreth
(74) *Attorney, Agent, or Firm*—Crowell & Moring LLP

(57) ABSTRACT

A motor vehicle has a roof which can be adjusted between an opened and a closed position, and which has a roof skin. A rollover protection element can be moved out from an inoperative position into a protection position. For improved rollover protection, when the roof is in the closed position, the rollover protection element projects over the roof skin in the protection position.

2 Claims, 2 Drawing Sheets

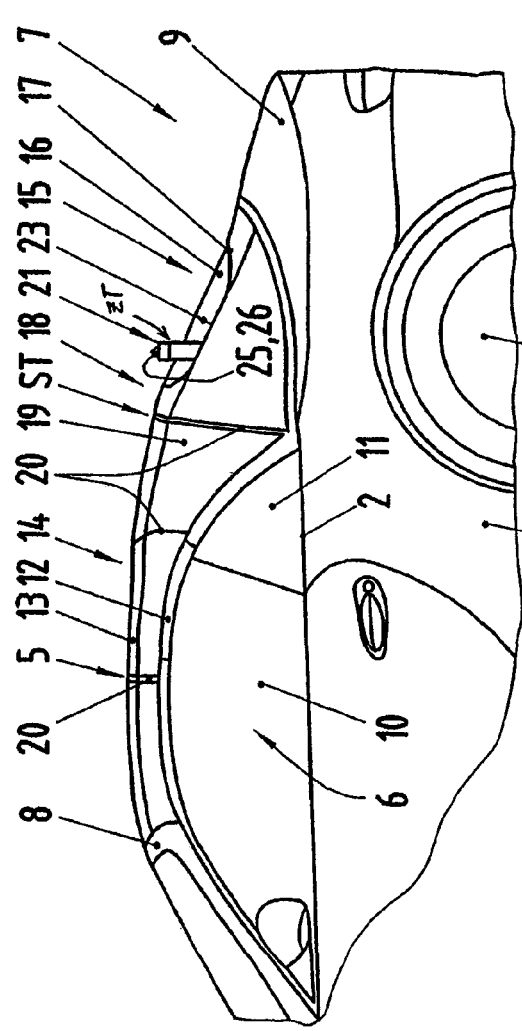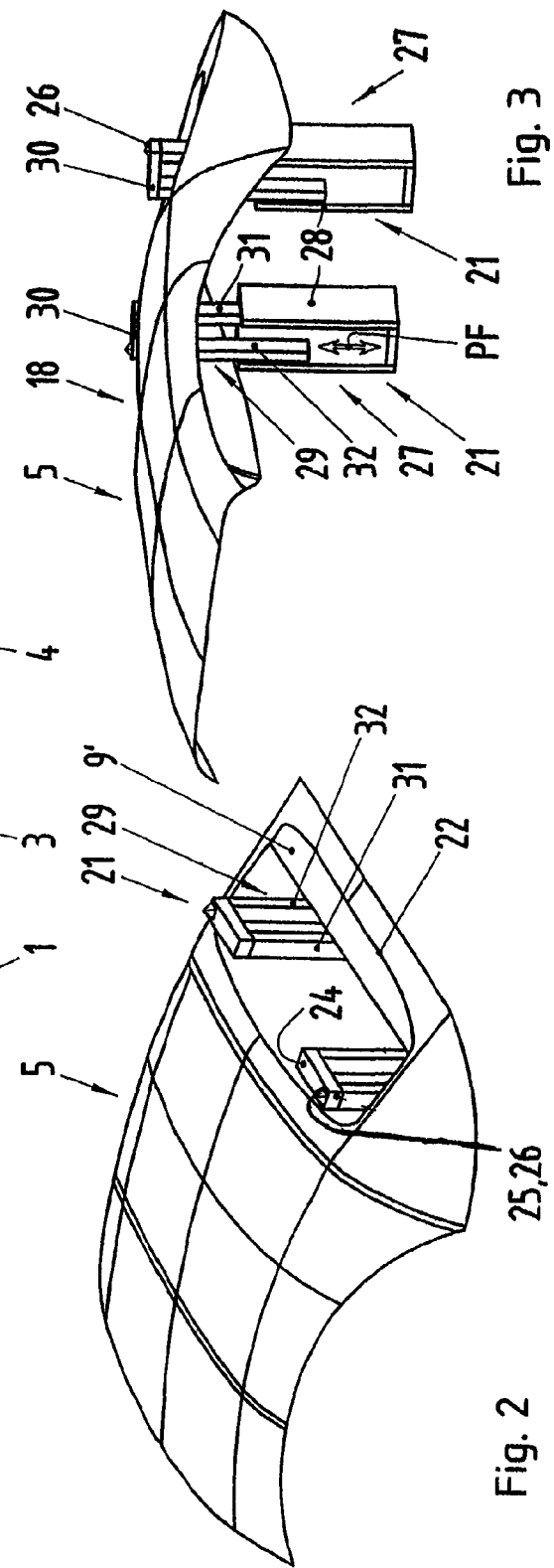

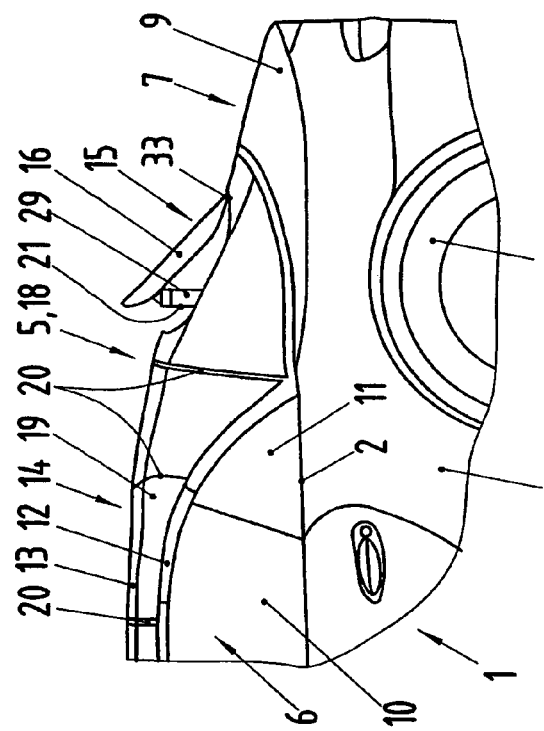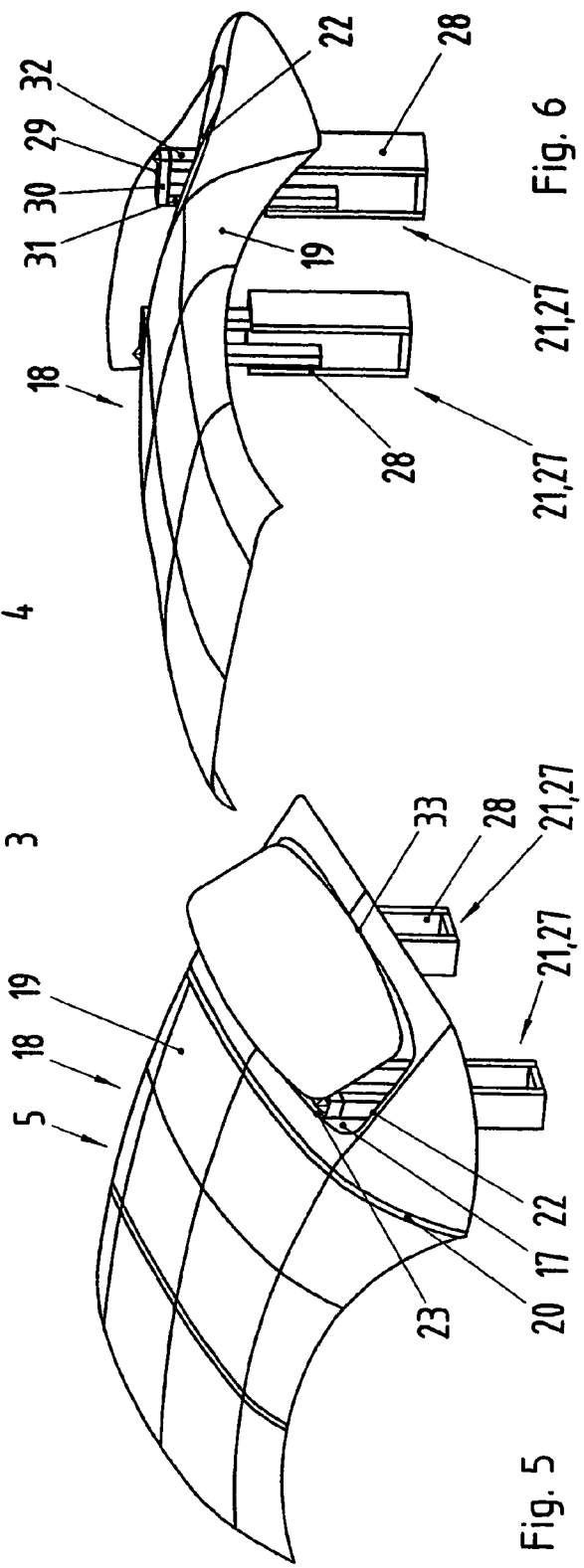

MOTOR VEHICLE WITH A MOVABLE ROOF AND AN EXTENSIBLE ROLLOVER PROTECTION ELEMENT

BACKGROUND AND SUMMARY OF THE INVENTION

This application claims the priority of German patent document 10 2004 062 999.4, filed Dec. 22, 2004, the disclosure of which is expressly incorporated by reference herein.

The present invention is directed to a motor vehicle having a movable roof and an extensible rollover protection element.

A motor vehicle of the above-mentioned type, known from German Patent Document DE 103 29 903 B3, has a movable roof in the form of a convertible top into whose roof skin a rear window is inserted. The motor vehicle also has a rollover protection element which is constructed as at least one rollover bar arranged behind a vehicle seat. The rollover bar, which is extensible from a lower or retracted inoperative position into an extended protective position projecting over the belt line of the motor vehicle, is held in a receiving cassette. When the roof is in the closed position, the rollover element takes up a first protective position, which is dimensioned such that the roof skin or the rear window are not destroyed. When the roof is in the opened position, the rollover protection element is moved out into a second protective position which projects over the first protective position.

One object of the invention is to provide a motor vehicle of the initially mentioned type, which affords improved rollover protection.

This and other objects and advantages are achieved by the present invention, which provides an enlarged protection area for the vehicle occupant/occupants, independently of the position of the roof (opened or closed). That is, the move-out height of the rollover protection element is maximally, selected independently of the roof position.

According to a further embodiment of the invention, the rollover protection element breaks through the roof skin in its protective position. In this case, it can be provided that the rollover protection element pushes through a non-transparent section of the roof skin. As an alternative, the rollover protection element can push through a transparent section (specifically, the rear window), or can at least partially detach or cut the rear window out of the roof skin. In a preferred embodiment, the rear window is equipped with a desired breaking point for this purpose which reliably permits a destruction of the rear window, and/or the rear window is held in the roof skin by way of a desired breaking point.

In order to favorably influence the destruction of the rear window or the penetration of the roof skin, in another preferred embodiment, the rollover protection element is equipped with a piercing element, particularly, Finally, the movable roof may be constructed as a convertible top with a flexible convertible top material which, together with the rear window, can form the roof skin. However, it would also be possible to construct the roof as a convertible top which has a firm roof skin, for example, made of sheet metal, into which the rear window is inserted.

Other objects, advantages and novel features of the present invention will become apparent from the following detailed description of the invention when considered in conjunction with the accompanying drawings.

BRIEF DESCRIPTION OF THE DRAWINGS

FIGS. 1 to 3 illustrate a first embodiment of a roof of a motor vehicle with a rollover protection element according to the invention; and FIGS. 4 to 6 depict a second embodiment of a roof of a motor vehicle having a rollover protection element.

DETAILED DESCRIPTION OF THE DRAWINGS

In a lateral view, FIG. 1 partially illustrates a motor vehicle 1, particularly a convertible having a vehicle body 3 (with a belt line 2) carried by a chassis with wheels (of which only one wheel 4 is shown). Above the belt line 2, a movable or adjustable roof 5 is arranged in a closed position ST, in which the vehicle roof 5 spans the occupant compartment 6 in a curved manner from a rear area 7 to an upper cowl 8. In an open position (not shown), the roof can be deposited in a rear area in a convertible top compartment 9' arranged under a removable convertible top compartment lid 9. Laterally above the belt line 2, the vehicle occupant compartment 6 is also bounded by movable side windows 10 and 11 respectively which, in their raised position, reach to a lateral roof frame 12 of the roof 5.

The roof 5 has an exterior roof skin 13 which comprises a first non-transparent section 14 and (particularly close to the rear area 7) a second, transparent, section 15. The second section 15 is formed particularly by a rear window 16 inserted into the roof skin 13. This rear window 16 is constructed as a rigid pane which is fastened in a cutout 17 in the roof skin 13. The roof 5 is preferably constructed as a convertible top 18 and has a flexible convertible top cover 19 as the first section 14, which convertible top cover 19 is carried by a here only partly visible convertible top linkage 20 to which the roof frame 12 is also assigned.

At least one rollover protection element 21 is arranged in the vehicle occupant compartment 6 behind vehicle seats (not shown) and in front of the convertible top compartment 9'. The rollover protection element 21 can be displaced from a retracted inoperative position (not shown) into an extended protection position ZT in which it projects over the belt line 2. The inoperative position may be situated under or close to the belt line 2.

In the protection position ZT, the rollover protection element 21 has penetrated the roof skin 13 and thus projects over the latter, as illustrated in different views in FIGS. 1 to 3. In particular, in the inoperative position, the rollover protection element 21 is arranged below the transparent section 15, and penetrates its plane 22 in order to reach the protection position ZT, in which plane 22 the rear window 16 is situated. That is, for this purpose, the rollover protection element 21 breaks through the roof skin 13 (for example, the rear window 16) by a partial destruction of the roof skin 13 (particularly the rear window 16 which is thereby detached from the non-transparent first section 14 of the roof skin 13).

In order to facilitate breaking through the rear window 16, this window 16 may have a desired breaking point 23 which is formed by a weakening of the material. For destroying the rear window 16, generally for breaking through the roof skin, the rollover protection element 21 may have punctiform, locally mounted piercing element 25 on it's top side 24 facing the roof skin 13, As illustrated in FIGS. 2 and 3, two rollover protection elements 21 mounted side-by-side may be inserted into the motor vehicle 1. Each of the elements 21 is constructed as a cassette 27 with a fastening and guiding frame 28 and a rollover bar 29 guided therein in a vertically displaceable (arrow PF) manner, with a base 30 (top side 24) and two guiding legs 31 and 32. So that the rollover bar 29 can be moved into the protection position ZT, a sensor (not shown) and a corresponding control unit are provided for a triggering control of the rollover bar 29, held in the inoperative position. The sensor and the control unit detect the start of a rollover event of the motor vehicle 1, and release the rollover bar 29 preferably pretensioned in the protection position ZT direction by means of a triggering mechanism. However, the sensor, the control unit and the triggering mechanism are known, so that a further description is unnecessary.

A second embodiment of a roof 5 is described by means of FIGS. 4 to 6. Identical parts or parts acting in an identical manner are provided with the same reference numbers as in FIGS. 1 to 3 and vice-versa. The desired breaking point 23 is situated between the rear window 16 and the first non-transparent section 14 of the roof skin 13. The rear window 16 is held in the roof skin 13 (not shown in FIGS. 3 to 6). In any case, in its normal position, the rear window 16 is situated in the plane 22. The desired breaking point 23 can be constructed at the cutout 17 in a surrounding or only in a partial manner, so that the rear window 16 can be folded open about its folding axis 33 which allows the rollover protection element 21 to be brought into its protection position ZT without destroying the rear window 16. However, a combination of destroying and cutting the rear window 16 out of the roof skin 13 would also be conceivable. Irrespective thereof, the rollover protection element 21 also breaks through the plane 22 of the rear window 16 according to the second embodiment, so that it can project over the roof skin 13 when it is moved into the protection position ZT.

When the roof 5 is opened, the rollover protection element 21 is displaced into the same protection position ZT. Irrespective of the position of the roof 5, an expanded protection area for the occupant/occupants of the vehicle 1 is provided below an imagined tangent on the cowl 8 and the top side 24 of the rollover protection element 21.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A convertible motor vehicle having a roof adjustable between an open and a closed position relative to a body of the vehicle, comprising:

roof skin comprised of a flexible folding top material;

a rollover protection element which can be moved from an inoperative position into a protection position; and a rigid pane rear window arranged in the roof skin with the rollover protection element being configured such that, in moving to its protection position, the rollover protection element pushes through a plane of the rear window to at least partially detach the rear window from the roof skin with a weakened area therebetween, wherein the roof is arranged above a belt line of the vehicle body and the rollover protection element projects outside the roof skin in the protection position, including when the roof is in the closed position.

2. The motor vehicle according to claim 1, wherein a top side of the rollover protection element facing the roof skin has a piercing element.

* * * * *